US009517662B2

(12) United States Patent
Kawakami

(10) Patent No.: US 9,517,662 B2
(45) Date of Patent: Dec. 13, 2016

(54) PNEUMATIC TIRE

(71) Applicant: TOYO TIRE & RUBBER CO., LTD., Osaka-shi, Osaka (JP)

(72) Inventor: Kazuki Kawakami, Osaka (JP)

(73) Assignee: TOYO TIRE & RUBBER CO., LTD., Osaka (JP)

( * ) Notice: Subject to any disclaimer, the term of this patent is extended or adjusted under 35 U.S.C. 154(b) by 1002 days.

(21) Appl. No.: 13/644,856

(22) Filed: Oct. 4, 2012

(65) Prior Publication Data

US 2013/0098516 A1  Apr. 25, 2013

Related U.S. Application Data

(60) Provisional application No. 61/679,111, filed on Aug. 3, 2012.

(30) Foreign Application Priority Data

Oct. 20, 2011  (JP) .................................. 2011-230925

(51) Int. Cl.
*B60C 13/00* (2006.01)
*B60C 19/08* (2006.01)

(52) U.S. Cl.
CPC ............. *B60C 19/086* (2013.04); *B60C 13/00* (2013.01)

(58) Field of Classification Search
CPC ....... B60C 19/08; B60C 19/082; B60C 19/086
See application file for complete search history.

(56) References Cited

U.S. PATENT DOCUMENTS

| 8,960,245 B2* | 2/2015 | Yonetsu ..................... 152/152.1 |
| 2009/0173419 A1 | 7/2009 | Kawakami |
| 2009/0308512 A1* | 12/2009 | Nakamura .............. B60C 19/08 152/152.1 |

FOREIGN PATENT DOCUMENTS

| JP | 2009-1228 | * | 1/2009 |
| JP | 2009-161070 A | | 7/2009 |
| JP | 2010-115935 A | | 5/2010 |

* cited by examiner

*Primary Examiner* — Justin Fischer
(74) *Attorney, Agent, or Firm* — Westerman, Hattori, Daniels & Adrian, LLP

(57) ABSTRACT

A diametrical conductive portion extending in a tire diametrical direction in a tire meridian cross section is provided at least in a nonconductive position in a side rubber portion which is constructed by a side wall rubber and a rim strip rubber, a conductive branch portion is provided so as to be branched from the diametrical conductive portion, extend to at least one in a thickness direction of the side rubber portion and pass through an inner portion of the side rubber portion, and the conductive branch portion is arranged at a position which sections at least half position in the thickness direction of the side rubber portion into an outer side in a tire diametrical direction and an inner side in the tire diametrical direction, and is formed by a conductive rubber which has a different hardness from a rubber hardness of the side rubber portion.

5 Claims, 6 Drawing Sheets

PNEUMATIC TIRE

BACKGROUND OF THE INVENTION

Field of the Invention

The present invention relates to a pneumatic tire which can discharge a static electricity generated in a vehicle body and a tire to a road surface.

Description of the Related Art

In recent years, for the purpose of reducing a rolling resistance of a tire which has a strong relationship with a fuel consumption performance, there has been proposed a pneumatic tire in which a rubber member such as a tread rubber or the like is formed by a nonconductive rubber in which a silica is blended at a high rate. However, since the rubber member mentioned above is high in an electric resistance in comparison with a conventional product in which a carbon black is blended at a high rate, and inhibits a discharge of a static electricity which is generated in a vehicle body or a tire to a road surface, there is a problem that a defect such as a radio noise or the like tends to be generated.

Accordingly, there has been developed a pneumatic tire structured such that an exciting performance can be achieved by providing a conductive rubber in which a carbon black or the like is blended, while forming a tread rubber by a nonconductive rubber. For example, in a pneumatic tire described in patent document 1 (JP-A-2009-161070), there is disclosed a tire in which a conductive route for discharging a static electricity is constructed by making a conductive rubber extend to a side surface of a bottom surface from a ground surface of a tread rubber through an inner portion of the tread rubber which is formed by a nonconductive rubber. Further, a tire in which a conductive route is formed in the same manner as mentioned above is disclosed in patent document 2 (JP-A-2010-115935).

SUMMARY OF THE INVENTION

With respect to the conventional tire mentioned above, in order to further reduce the rolling resistance so as to improve the fuel consumption performance, it is preferable to form not only the tread rubber but also a carcass which runs into a bead portion from a tread portion via a side wall portion, a side wall rubber which is arranged in an outer side of the carcass in the side wall portion, and a rim strip rubber which is arranged in an outer side of the carcass in the bead portion by the nonconductive rubber. Even in this case, it is necessary to appropriately secure the conductive route in the same manner as mentioned above.

Further, in order to provide a comfortable ride quality, it is desirable to be excellent in an absorbability of a vibration which is generated in the tire at a time of climbing over a step or the like, and a damping performance of the vibration, in the tire. Since a rigidity of a tire side such as the side wall rubber and the rim strop rubber greatly contributes to the absorbability and the damping performance, it is preferable that a rigidity of the positions can be easily adjusted.

The present invention is made by paying attention to the problem mentioned above, and an object of the present invention is to provide a pneumatic tire in which a rigidity of a tire side can be easily adjusted while appropriately securing an exciting performance, and a ride quality is improved by improving an absorbability or a damping performance.

In order to achieve the object mentioned above, the present invention employs the following means. In other words, a pneumatic tire in accordance with the present invention is a pneumatic tire including:

a nonconductive carcass which runs into a bead portion from a tread portion via a side wall portion;

a side wall rubber which is provided in an outer side of the carcass in the side wall portion;

a rim strip rubber which is provided in an outer side of the carcass in the bead portion; and a conductive route which electrically connects a ground surface of the tread portion and a rim contact position of the bead portion, at least one of the side wall rubber and the rim strip rubber being formed by a nonconductive rubber, wherein a diametrical conductive portion extending in a tire diametrical direction in a tire meridian cross section is provided at least in a nonconductive position in the side rubber portion which is constructed by the side wall rubber and the rim strip rubber, the diametrical conductive portion is formed by a conductive rubber so as to construct a part of the conductive route, a conductive branch portion is provided so as to be branched from the diametrical conductive portion, extend to at least one in a thickness direction of the side rubber portion and pass through an inner portion of the side rubber portion, and the conductive branch portion is arranged at a position which sections at least half position in the thickness direction of the side rubber portion into an outer side in a tire diametrical direction and an inner side in the tire diametrical direction, and is formed by a conductive rubber which has a different hardness from a rubber hardness of the side rubber portion.

For example, if the side rubber portion is sectioned into the outer side and the inner side in the tire diametrical direction by a conductive rubber which has a higher hardness than the hardness of the side rubber portion constructed by the side wall rubber and the rim strip rubber, the rigidity of the tire side is enhanced, the damping performance is increased and the ride quality is improved, in comparison with the case that it is not sectioned. On the contrary, if the side rubber portion is sectioned into the outer side and the inner side in the tire diametrical direction by arranging a conductive rubber which has a lower hardness than the hardness of the side rubber portion in a thickness direction, the rigidity of the tire side becomes lower, the absorbability is increased and the ride quality is improved, in comparison with the case that it is not sectioned. In the present invention, the conductive branch portion formed by the conductive rubber which has the different hardness from the rubber hardness of the side rubber portion is arranged at the position which sections at least the half position in the thickness direction of the side rubber portion into the outer side in the tire diametrical direction and the inner side in the tire diametrical direction, by utilizing this. Accordingly, only by arranging the conductive branch portion mentioned above, it is possible to change the rigidity of the tire side in comparison with the case that the conductive branch portion is not provided so as to set to a desired rigidity, it is possible to improve the absorbability or the damping performance through an appropriate rigidity setting, and it is possible to improve the ride quality.

Of course, since the diametrical conductive portion which is provided at least in the nonconductive position in the side rubber portion constructed by the side wall rubber and the rim strip rubber constructs a part of the conductive route which runs into the rim from the ground surface of the tread portion, it is possible to appropriately secure a conductive performance.

In order to improve the ride quality, it is preferable that the conductive branch portion is arranged in a plurality of rows in the tire diametrical direction. In accordance with this structure, it is possible to appropriately set a rigidity of the tire side which runs into the bead portion from the tread portion side, and it is possible to further improve the ride quality.

In order to further improve the ride quality, it is effective that the conductive branch portion segments the side rubber portion while passing through the side rubber portion in the thickness direction. In accordance with this structure, it is possible to enlarge a change amount of the rigidity in comparison with the case that a leading end of the conductive branch portion terminates at the inner portion of the side rubber portion, and it is possible to further improve the ride quality.

In order to reduce the rolling resistance of the tire, it is desirable that a leading end of the conductive branch portion terminates at the inner portion of the side rubber portion. In accordance with this structure, it is possible to reduce an amount of the conductive rubber so as to increase the nonconductive rubber, and it is possible to reduce the rolling resistance of the tire, in comparison with the case that the conductive branch portion segments the side rubber portion while passing through the side rubber portion in the thickness direction.

In order to improve a cut resistance and a weather resistance, it is preferable that the diametrical conductive portion constructed by the conductive rubber is arranged at a position which covers an outer surface of the side rubber portion. In general, the conductive rubber in which the carbon black is blended at a high rate is excellent in the cut resistance and the weather resistance in comparison with the nonconductive rubber in which the silica is blended at a high rate. Therefore, in accordance with this structure, it is possible to improve the cut resistance and the weather resistance in comparison with the case that the diametrical conductive portion is arranged in the inner portion or the inner surface of the side rubber portion.

DETAILED DESCRIPTION OF THE PREFERRED EMBODIMENTS

Figure 1:
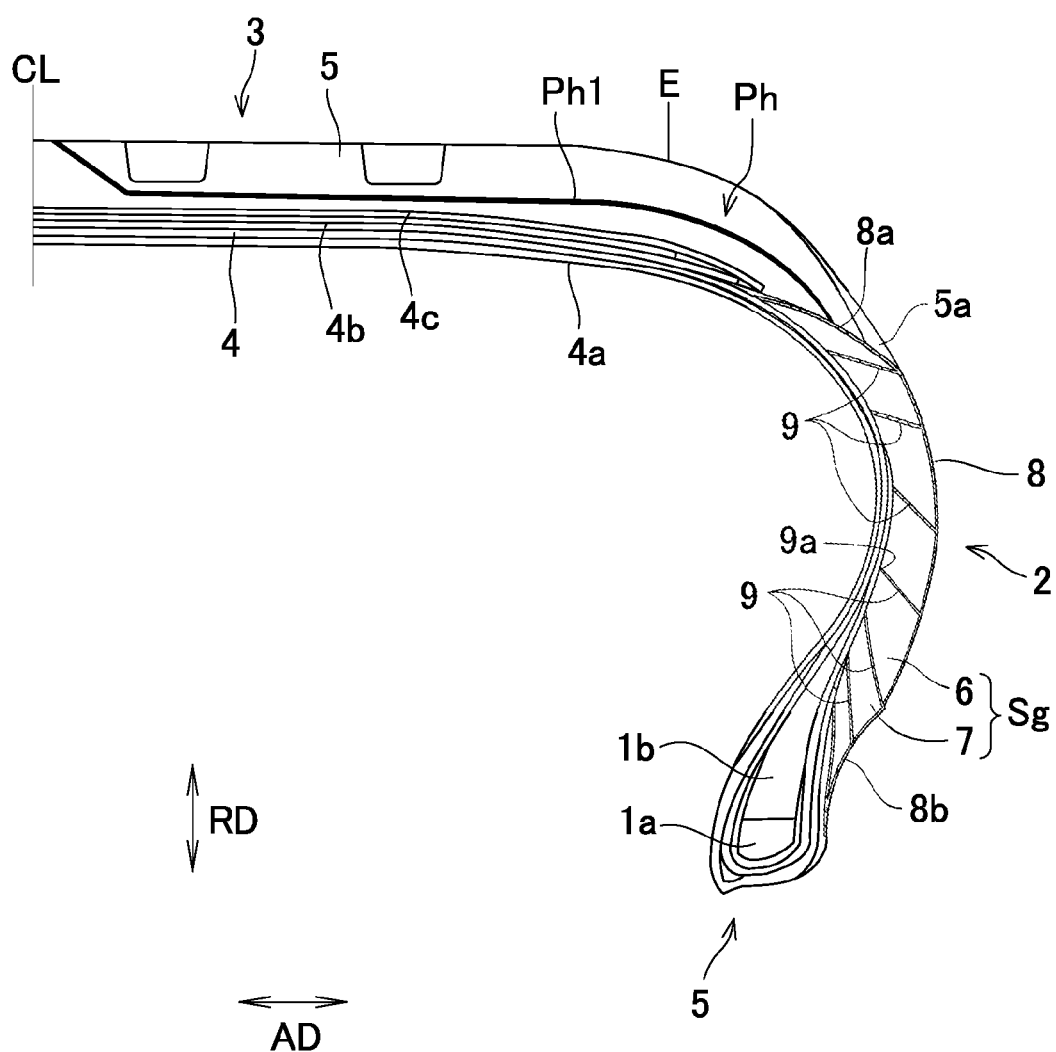
FIG. 1 is a tire meridian cross sectional view showing an example of a pneumatic tire in accordance with the present invention.

A description will be given below of a pneumatic tire in accordance with an embodiment of the present invention with reference to the accompanying drawings As shown in FIG. 1, a pneumatic tire T is provided with a pair of bead portions 1, side wall portions 2 which extend to an outer side in a tire diametrical direction RD from the respective bead portions 1, and a tread portion 3 which is connected to outer ends in the tire diametrical direction RD of both the side wall portions 2. In the bead portion 1, there are arranged an annular bead core 1a which coats by rubber a convergence body such as a steel wire or the like, and a bead filler 1b which is made of a hard rubber.

Further, the tire T is provided with a toroidal carcass 4 which runs into the bead portion 1 from the tread portion 3 via the side wall portion 2. The carcass 4 is constructed by at least one carcass ply, and is locked in a state in which an end portion thereof is wound up via the bead core 1a. The carcass ply is formed by coating a cord which extends approximately vertically to a tire equator CL with a topping rubber which is constructed by a nonconductive rubber. An inner liner rubber 4a for retaining a pneumatic pressure is arranged in an inner side of the carcass 4.

Further, the pneumatic tire T has a tread rubber 5 which is formed by a nonconductive rubber and is provided in an outer side of the carcass 4 in the tread portion 3, a side wall rubber 6 which is formed by a nonconductive rubber and is provided in an outer side of the carcass 4 in the side wall portion 2, and a rim strip rubber 7 which is formed by a nonconductive rubber and is provided in an outer side of the carcass 4 in the bead portion 1. A belt 4b is provided in an inner side of the tread rubber 4 for reinforcing the carcass 4, and a belt reinforcing member 4c is provided in an outer side of the belt 4b.

In the present embodiment, there is employed a tread-on-side structure in which both side end portions of the tread rubber 5 are mounted to an outer end in the tire diametrical direction of the side wall rubber 6, and a tread strip 5a having a triangular cross sectional shape is joined to a side portion of the tread rubber 5. In this case, in the present embodiment, there is employed the tread-on-side structure, however, the structure is not limited to this structure, but it is possible to employ a side-on-tread structure in which an outer end portion in the tire diametrical direction RD of the side wall rubber 6 is mounted to both side end portions of the tread rubber 5.

In this case, the conductive rubber is exemplified by a rubber in which a volume resistivity is less than $10^8$ Ωcm, and is produced, for example, blending a carbon black as a reinforcing agent at a high rate in a raw material rubber. It can be obtained by blending a carbon group of known conductive applying agent such as a carbon fiber, a graphite or the like and a metal group of known conductive applying agent such as a metal powder, a metal oxide, a metal flake, a metal fiber or the like, in addition to the carbon black.

Further, the nonconductive rubber is exemplified by a rubber in which a volume resistivity is equal to or more than $10^8$ Ωcm, and is exemplified by a material in which a silica is blended as a reinforcing agent at a high rate in the raw material rubber. The silica is blended, for example, at 30 to 100 mass part with respect to 100 mass part of the raw material rubber component. A wet silica is preferably employed as the silica, however, any silica can be used as long as it is generally used as the reinforcing material. The nonconductive rubber may be produced by blending a burned clay, a hard clay, a calcium carbonate or the like in addition to a silica such as a precipitated silica, an anhydrous silic acid or the like.

At the raw material rubber mentioned above, there can be listed up a natural rubber, a styrene butadiene rubber (SBR), a butadiene rubber (BR), an isoprene rubber (IR), a butyl rubber (IIR) and the like, and they are used as one kind singly or as a mixture of two or more kinds. A vulcanizing agent, a vulcanization accelerator, a plasticizing material, an antioxidant or the like is approximately blended in the raw material rubber.

As shown in FIG. 1, there is formed a conductive route Ph which electrically connects a ground surface of the tread portion 3 and a rim contact position of the bead portion 1. As a structure which constructs apart of the conductive route Ph, a conductive rubber member Ph1 in which one end is exposed to the ground surface and the other end runs into the side wall rubber 6 is embedded in the tread rubber 5.

Further, as a structure which constructs a part of the conductive route Ph, there is provided a diametrical conductive portion 8 which is formed by a conductive rubber. In the case that the side wall rubber 6 and the rim strip rubber 7 are comprehensively called as a side rubber portion Sg, the diametrical conductive portion 8 is provided at least in the nonconductive position in the side rubber portion Sg. The diametrical conductive portion 8 is arranged so as to extend to an inner side in the tire diametrical direction RD from an outer side in the tire diametrical direction RD in a transverse section (called also as a tire meridian cross section) which is orthogonal to a tire peripheral direction. In the present embodiment, since both the side wall rubber 6 and the rim strip rubber 7 are formed by the nonconductive rubber, a whole of the side rubber portion Sg becomes nonconductive, and is arranged at a position which coats an outer surface (a surface in an outer side in a tire axial direction AD) of the nonconductive position (the side wall rubber 6 and the rim strip rubber 7). In this case, since the conductive rubber in which the carbon black is blended at a high rate is generally excellent in a cut resistance and a weather resistance in comparison with the nonconductive rubber in which the silica is blended at a high rate, the cut resistance and the weather resistance are improved by coating the outer surface of the side rubber portion Sg by the diametrical conductive portion 8.

The diametrical conductive portion 8 is structured such that an outer end portion 8a in the tire diametrical direction RD thereof is connected to the conductive rubber member Ph1 which is exposed to the ground surface, and an inner end portion 8b in the tire diametrical direction RD is exposed to a rim contact region of the bead portion 1. In other words, the diametrical conductive portion 8 constructs the conductive route Ph which runs into the rim contact region of the bead portion 1 from the ground surface of the tread portion 3 together with the conductive rubber member Ph1, and secures a conductive performance.

In the above, the ground surface is a surface which is grounded on a road surface at a time of putting the tire vertically on a flat road surface in a state of assembling in a normal rim and filling a normal internal pressure, and applying a normal load, and an outermost position in the tire axial direction AD comes to a ground end E. In this case, the normal load and the normal internal pressure are set to a maximum load (a design normal load in the case of a tire for a passenger car) which is defined in JISD4202 (specifications of an automotive tire) or the like and a pneumatic pressure corresponding thereto, and the normal rim is in principle set to a standard rim which is defined in JISD4202 or the like.

Figure 2:
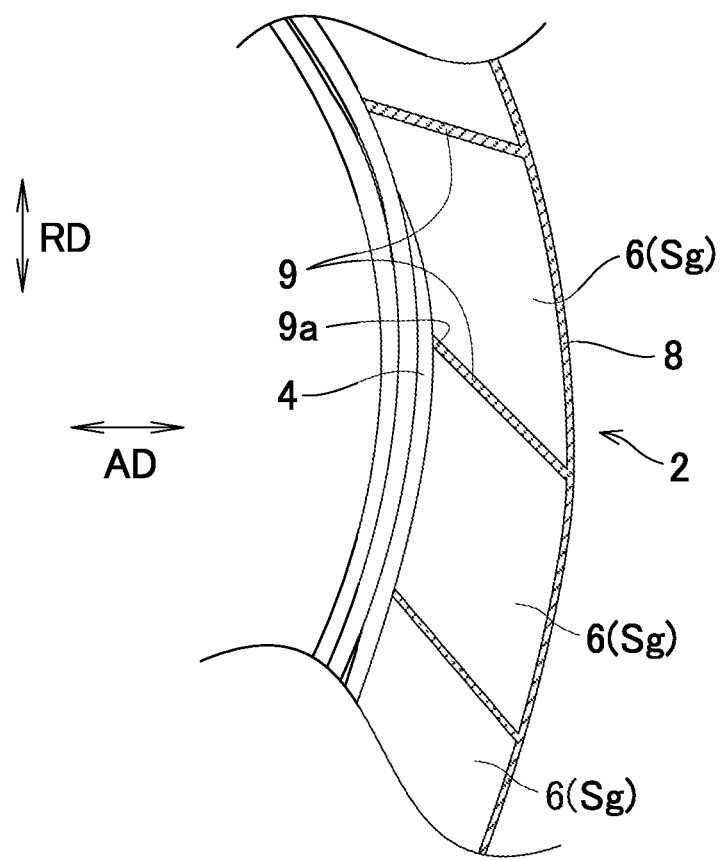
FIG. 2 is a cross sectional view showing a segmented position of a side wall rubber by a conductive branch portion and a periphery thereof.

Further, as shown in FIG. 1 and FIG. 2, there is provided a conductive branch portion 9 which is branched from a midstream position between both the ends 8a and 8b in the tire diametrical direction RD in the diametrical conductive portion 8 so as to extend to an inner side in a thickness direction of the side rubber portion Sg and pass through an inner portion of the side rubber portion Sg. The conductive branch portion 9 passes through the side rubber portion in the thickness direction so as to segment the side rubber portion Sg into an outer side in the tire diametrical direction RD and an inner side in the tire diametrical direction RD, and is formed by a conductive rubber having a different hardness from a rubber hardness of the side rubber portion Sg. In the present embodiment, a leading end 9a of the conductive branch portion 9 comes into contact with the carcass 4.

For example, if the rubber hardness of the conductive branch portion 9 is made higher than the rubber hardness of the side rubber portion Sg, a rigidity in the tire side rise, so that a damping performance is improved. On the contrary, if the rubber hardness of the conductive branch portion 9 is made lower than the hardness of the side rubber portion Sg, the rigidity in the tire side comes down, so that an absorbability is improved. In order to obtain the effect mentioned above, it is preferable to set a rubber hardness difference between the side rubber portion Sg which is constructed by the side wall rubber 6 and the rim strip rubber 7, and the conductive branch portion 9 equal to or more than 1 degree, and in order to effectively improve the tire damping performance and the tire absorbability, a hardness difference equal to or more than 3 degree. The rubber hardness in this case means a hardness which is measured in accordance with a durometer hardness test (type A) of JISK6253.

Accordingly, in the present embodiment, it is possible to change the rigidity in the tire side in comparison with the case that the conductive branch portion 9 is not provided so as to set to a desired rigidity, only by arranging the conductive branch portion 9 mentioned above, whereby it is possible to improve an absorbability or a damping performance through an appropriate rigidity setting, and it is possible to improve a ride quality.

Further, in the present embodiment, since the conductive branch portion 9 is arranged in a plurality of rows in the tire diametrical direction RD, the segmented positions by the conductive branch portion 9 are set at a plurality of positions along the tire diametrical direction RD. A distance of a plurality of conductive branch portions 9 may be fixed or may not be fixed. The narrower the distance between the conductive branch portions 9 is, the stronger the effect appears, and the wider the distance is, the weaker the effect appears. Accordingly, it is possible to differentiate an arrangement distance of the conductive branch portions 9 in accordance with the positions. In accordance with this, it is possible to appropriately set the rigidity in the tire side from the tread portion 3 to the bead portion 1 in accordance with the positions, and it is possible to further improve the ride quality.

Other Embodiments (1) In the present embodiment, both of the side wall rubber 6 and the rim strip rubber 7 are formed by the nonconductive rubber, however, the present invention can be applied as long as at least one of the side wall rubber and the rim strip rubber is formed by the nonconductive rubber. As an applied example, there can be listed up a tire in which the side wall rubber is formed by the nonconductive rubber, and the rim strip rubber is formed by the conductive rubber. Of course, in the light of the reduction of the rolling resistance of the tire, it is preferable that at least the side wall rubber is formed by the nonconductive rubber.

(2) Further, in the present embodiment, the diametrical conductive portion 8 is provided at least in the nonconductive position in the side rubber portion Sg, however, in the case that the side rubber portion has not only the nonconductive position but also the conductive position, the diametrical conductive portion may be provided not only in the nonconductive position but also in the conductive position. As an example thereof, there can be listed up a tire in which the side wall rubber is formed by the nonconductive rubber, the rim strip is formed by the conductive rubber, and the diametrical conductive portion is provided in the rim strip rubber which is the conductive position.

(3) In the present embodiment, the conductive route Ph is constructed by the conductive rubber member Ph1 and the diametrical conductive portion 8, however, it is possible to variously modify as long as the diametrical conductive portion constructs a part of the conductive route. For example, there can be listed up a tire in which an outer end in the tire diametrical direction RD of the diametrical conductive portion is exposed to the grounded surface. Further, in the case that the tread rubber is formed by the conductive rubber, there can be listed up a tire in which the outer end in the tire diametrical direction of the diametrical conductive portion is connected to the tread rubber. In the case that the rim strip rubber is formed by the conductive rubber, there can be listed up a tire in which an inner end in the tire diametrical direction of the diametrical conductive portion is connected to the rim strip rubber. Of course, it can be applied not only to the tread-on-side structure, but also a side-on-tread structure which is exemplified in FIG. 6.

Figure 3:
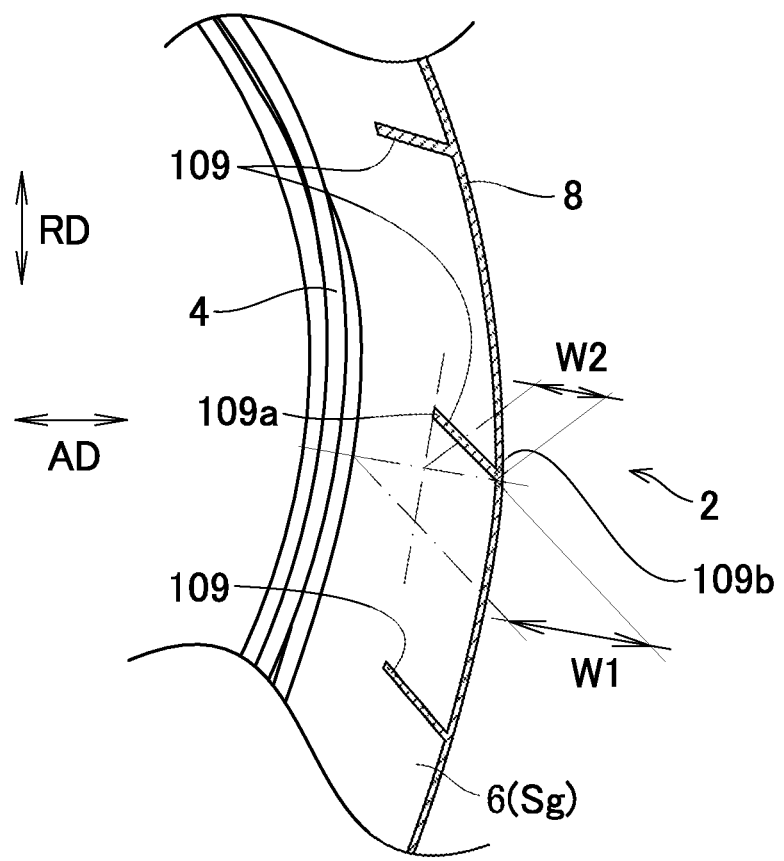
FIG. 3 is a cross sectional view showing a tire in accordance with the other embodiment of the present invention.

(4) Further, in the present embodiment, as shown in FIG. 1 and FIG. 2, the conductive branch portion 9 segments the side rubber portion Sg while passing through the side rubber portion Sg in the thickness direction, however, as long as a conductive branch portion 109 is arranged at a position which sections at least a half position in the thickness direction in the side rubber portion Sg into an outer side in the tire diametrical direction and an inner side in the tire diametrical direction RD, as shown in FIG. 3, the conductive branch portion 109 may be structured such that a leading end 109a thereof is terminated at an inner portion of the side rubber portion. In the drawing, a dimension in the thickness direction of the side rubber portion Sg is denoted by reference symbol W1, and a dimension in the thickness direction which is segmented by the conductive branch portion 109 is denoted by reference symbol W2. They are set in such a manner as to satisfy a relationship W1 W2/2. As mentioned above, as long as the conductive branch portion 109 segments the position which is between 50 and 100% in a tire axial direction AD of the side rubber portion Sg (or the thickness direction of the side rubber portion Sg), it is possible to obtain an effect of improving a ride quality. In addition, since the leading end 109a of the conductive branch portion 109 is terminated at the inner portion of the side rubber portion Sg, it is possible to reduce a volume of the conductive rubber so as to increase a volume of the nonconductive rubber, and it is also possible to reduce the rolling resistance of the tire, in comparison with the case that the conductive branch portion 109 passes through the side rubber portion Sg in the thickness direction. In this case, in FIG. 3, the thickness direction means a direction in which a distance between an outer surface and an inner surface becomes the shortest while passing through a branch position 109b between the conductive branch portion 109 and the diametrical conductive portion 8 in a meridian cross section.

Figure 4:
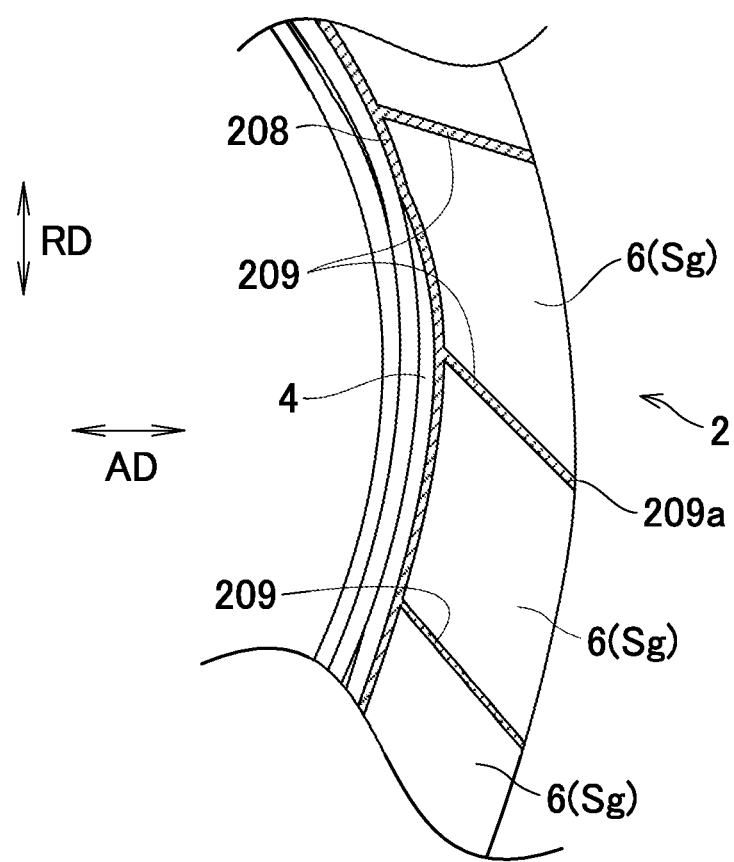
FIG. 4 is a cross sectional view showing a tire in accordance with the other embodiment than the above of the present invention.
Figure 5:
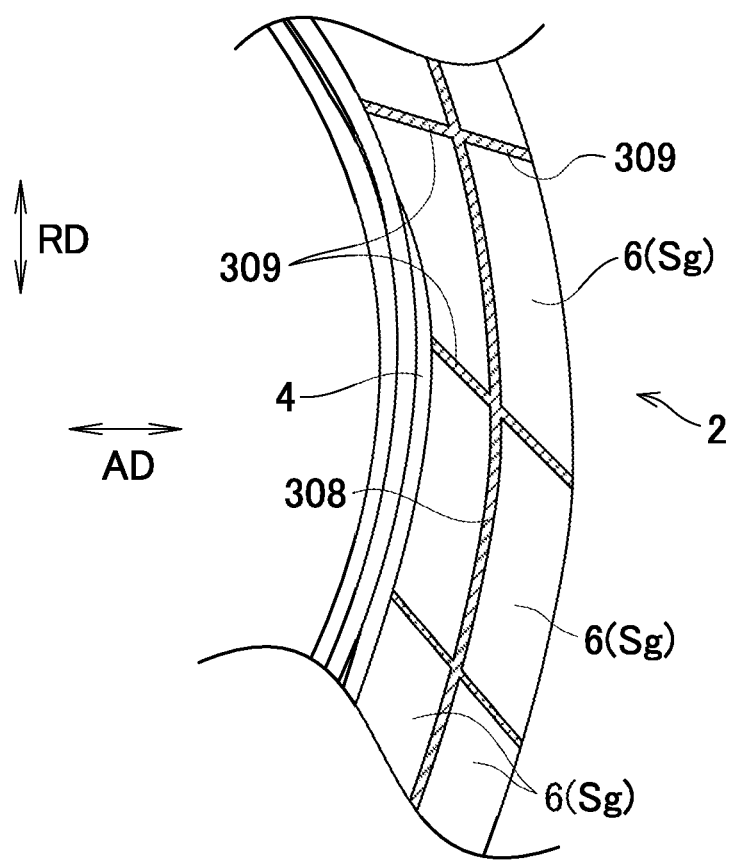
FIG. 5 is a cross sectional view showing a tire in accordance with the other embodiment than the above of the present invention.

(5) In addition, in the present embodiment, as shown in FIG. 2, the diametrical conductive portion 8 is arranged at the position which coats the outer surface (the surface in the outer side in the tire axial direction) of the side rubber portion Sg, however, a diametrical conductive portion 208 may be arranged in an inner surface (a surface in an inner side in the tire axial direction AD) of the side rubber portion Sg, as shown in FIG. 4. In this case, a conductive branch portion 209 is branched from the diametrical conductive portion 208 so as to extend to an outer side in the thickness direction. Since the side rubber portion Sg of the tire is formed as a curved shape which extends to the outer side in the thickness direction, a length of the conductive route by the diametrical conductive portion becomes shorter in the case of passing through the inner side in the thickness direction than in the case of passing through the outer side in the thickness direction. Therefore, in accordance with this structure, in comparison with the case that the diametrical conductive portion is arranged in the outer surface or the inner portion of the side rubber portion Sg, it is possible to make the length of the conductive route by the diametrical conductive portion shorter, and there is a case that it is possible to reduce the volume of the conductive rubber so as to reduce the rolling resistance. Further, as shown in FIG. 5, a diametrical conductive portion 308 may be arranged in the inner portion of the side rubber portion Sg. In this case, a conductive branch portion 309 is branched from the diametrical conductive portion 308 so as to extend at least to one side in the thickness direction. In the drawing, the diametrical conductive portion 308 extends to both sides in the thickness direction. Of course, as shown in FIG. 5, in the case that the diametrical conductive portion 308 is arranged in the inner portion of the side rubber portion Sg, the cut resistance is improved in comparison with the case that the diametrical conductive portion 308 is arranged in the inner surface of the side rubber portion Sg, in the same manner as the present embodiment mentioned above.

Figure 6:
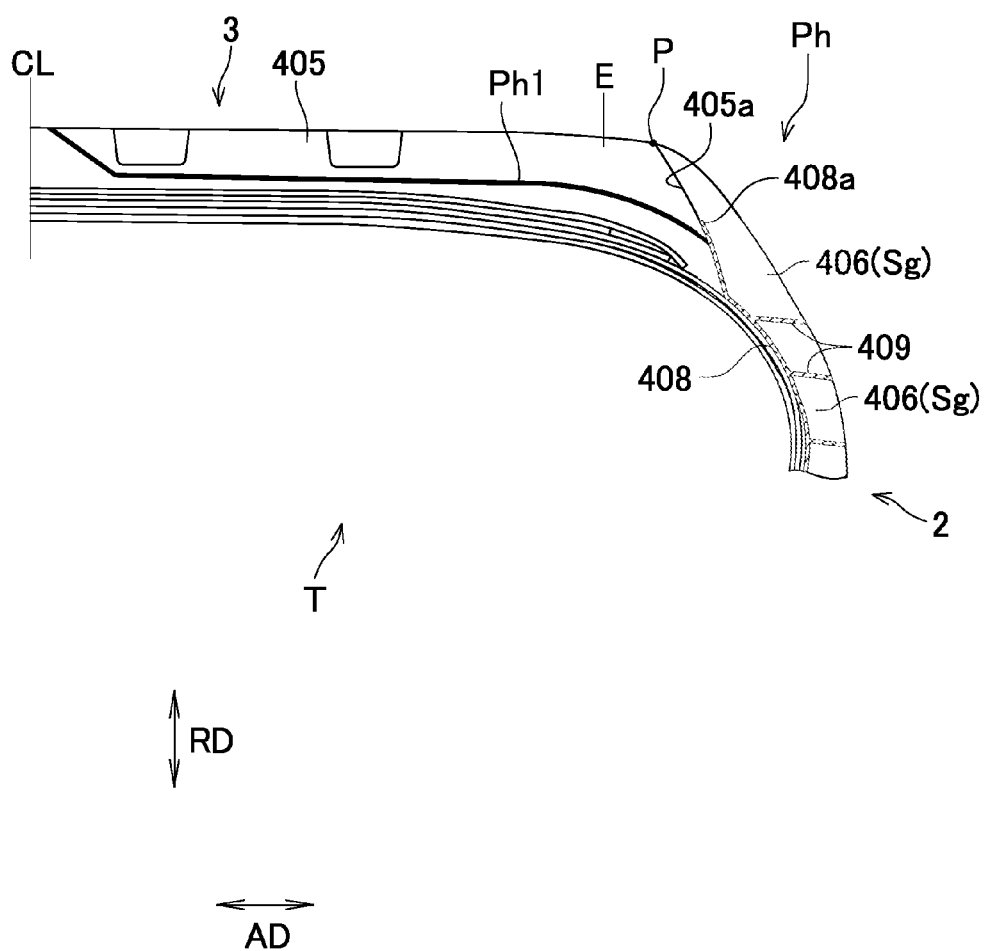
FIG. 6 is a cross sectional view showing a tire in accordance with the other embodiment than the above of the present invention.

Further, as mentioned above, in the present embodiment, the tread-on-side structure is employed, however, without being limited to this structure, it is possible to employ a side-on-tread structure in which an outer end portion in the tire diametrical direction of a side wall rubber 406 is mounted to both side end portions of a tread rubber 405, as exemplified in FIG. 6. For example, as shown in FIG. 6, there can be listed up a structure in which a conductive rubber member Ph1 is arranged at a position which reaches a side surface 405a of the tread rubber 405 from the grounded surface, and the conductive rubber member Ph1 is connected to a diametrical conductive portion 408 which is arranged in an inner surface of a side wall rubber 406 constructing the side rubber portion Sg. In this case, as shown in the drawing, an outer end 408a in the diametrical direction of the diametrical conductive portion 408 may be terminated at an inner portion of the tire without reaching the position P which is exposed to the tire outer portion, or the outer end 408a in the diametrical direction of the diametrical conductive portion 408 may extend to the position which is exposed to the tire outer portion. In this case, reference numeral 409 in the drawing denotes a conductive branch portion.

EXAMPLES

In order to specifically show the structure and the effect of the present invention, the following evaluations were carried out with regard to the following examples.

(1) Exciting Performance (Electric Resistance Value)

A predetermined load was applied to a tire which is installed to a rim, and an applied voltage (500 V) was applied to a metal plate on which the tire is grounded, from a shaft which supports the rim, whereby an electric resistance was measured.

(2) Rubber Hardness

A rubber composition was vulcanized for 30 minutes at 150, and a rubber hardness of a vulcanized rubber at 23 was measured in accordance with JISK6253.

(3) Ride Quality Bench Test (Absorbability and Damping Performance)

On the assumption that a maximum amplitude of a vibration generated at a time when a tire rotating receiving a predetermined load climbs over a projection having a predetermined height is set to an absorbability, and a time until the vibration is absorbed is set to a damping performance, each of them was measured. A measured value of a comparative example 1 is set to 100, the greater value indicates the more excellent.

(4) Cut Resistance and Weather Resistance

An ozone was irradiated to the tire, and a magnitude and a depth of a generated crack were set to one of the evaluation. The evaluation was carried out by setting a result of the comparative example 1 to 100, and the greater numerical value indicates the more excellent cut resistance and weather resistance.

Comparative Example 1

There was produced a tire having a size 205/55R16, in which the tread rubber 5, the side wall rubber 6, the rim strip rubber 7 and the carcass 4 were made of the nonconductive rubber.

Comparative Example 2

There was produced a tire in which a diametrical conductive portion was provided on an outer surface of a side wall rubber, and a conductive branch portion passing through in a thickness direction was provided in an inner portion of the side wall rubber. A rubber hardness of the conductive branch portion was set to be lower than a hardness of the side wall rubber. The others were set to the same as the tire in accordance with the comparative example 1.

EXAMPLE 1

With respect to the tire in accordance with the comparative example 1, a diametrical conductive portion was provided in outer surfaces of both the side wall rubber 6 and the rim strip rubber 7, and a conductive branch portion passing through in a thickness direction was provided in inner portions of the side wall rubber 6 and the rim strip rubber 7. A rubber hardness of the conductive branch portion was set to be lower than the hardness of the side wall rubber and the rim strip rubber. The others were set to the same as the tire in accordance with the comparative example 1.

EXAMPLE 2

There was produced a tire in which the rubber hardness of the conductive branch portion was set to be higher than the hardness of the side wall rubber and the rim strip rubber. The others were set to the same as the example 1.

EXAMPLE 3

With regard to the tire in accordance with the comparative example 1, the rim strip rubber was made of the conductive rubber, the diametrical conductive portion was provided on the outer surface of the side wall rubber, and a part of the conductive route was constructed by the diametrical conductive portion and the conductive rim strip rubber. Further, the conductive branch portion passing through in the thickness direction was provided in the inner portion of the side wall rubber. The rubber hardness of the conductive branch portion was set to be lower than the hardness of the side wall rubber. The others were set to the same as the tire in accordance with the comparative example 1.

EXAMPLE 4

With respect to the tire in accordance with the example 3, the diametrical conductive portion was provided on the outer surface of the rim strip rubber, and the conductive branch portion passing through in the thickness direction was provided in the inner portion of the rim strip rubber. The rubber hardness of the conductive branch portion was set to be lower than the hardness of the side wall rubber. The others were set to the same as the tire in accordance with the example 3.

EXAMPLE 5

The conductive branch portion was arranged at a position which segments a half position in a thickness direction of a side rubber portion which is constructed by the side wall rubber and the rim strip rubber. The others were set to the same as the example 4.

EXAMPLE 6

The diametrical conductive portion was arranged in an inner portion of the side rubber portion which is constructed by the side wall rubber and the rim strip rubber. The others were set to the same as the example 4.

EXAMPLE 7

The diametrical conductive portion was arranged in an inner surface (an inner surface in a tire axial direction) of the side rubber portion which is constructed by the side wall rubber and the rim strip rubber. The others were set to the same as the example 4.

TABLE 1

|  | Comparative Example 1 | Comparative Example 2 | Example 1 | Example 2 | Example 3 | Example 4 | Example 5 | Example 6 | Example 7 |
| --- | --- | --- | --- | --- | --- | --- | --- | --- | --- |
| Tread rubber | Non-conductive | Non-conductive | Non-conductive | Non-conductive | Non-conductive | Non-conductive | Non-conductive | Non-conductive | Non-conductive |
| Side wall rubber | Non-conductive | Non-conductive | Non-conductive | Non-conductive | Non-conductive | Non-conductive | Non-conductive | Non-conductive | Non-conductive |

TABLE 1-continued

|  | Comparative Example 1 | Comparative Example 2 | Example 1 | Example 2 | Example 3 | Example 4 | Example 5 | Example 6 | Example 7 |
|---|---|---|---|---|---|---|---|---|---|
| Rim strip rubber | Non-conductive | Non-conductive | Non-conductive | Non-conductive | Conductive | Conductive | Conductive | Conductive | Conductive |
| Carcass | Non-conductive | Non-conductive | Non-conductive | Non-conductive | Non-conductive | Non-conductive | Non-conductive | Non-conductive | Non-conductive |
| Arrangement of diametrical conductive portion in side wall rubber | Without | With | With | With | With | With | With | With | With |
| Arrangement of diametrical conductive portion in rim strip portion | Without | Without | With | With | Without | With | With | With | With |
| Segmenting range in width direction by conductive branch portion | — | 100% | 100% | 100% | 100% | 100% | 50% | 100% | 100% |
| Arranged position of diametrical conductive portion in side wall rubber | — | Outer side | Outer side | Outer side | Outer side | Outer side | Outer side | Center | Inner side |
| Arranged position of diametrical conductive portion in rim strip rubber | — | — | Outer side | Outer side | — | Outer side | Outer side | Center | Inner side |
| Hardness of side wall rubber | 60 | 60 | 60 | 60 | 60 | 60 | 60 | 60 | 60 |
| Rubber hardness of conductive branch portion | — | 56 | 56 | 64 | 56 | 56 | 56 | 56 | 56 |
| Ride quality absorbability | 100 | 103 | 105 | 95 | 103 | 104 | 103 | 105 | 105 |
| Ride quality damping performance | 100 | 97 | 95 | 105 | 97 | 96 | 97 | 95 | 95 |
| Electric resistance (MΩ) | ∞ | ∞ | 3 | 3 | 3 | 3 | 3 | 3 | 3 |
| Weather resistance | 100 | 110 | 110 | 110 | 110 | 110 | 110 | 110 | 110 |
| Cut resistance | 100 | 110 | 110 | 110 | 110 | 110 | 110 | 107 | 105 |

With regard to the exciting performance, it is known that the exciting performance is not secured in the comparative examples, however, the exciting performance is secured in the examples.

With regard to the ride quality, it is known that the absorbability is improved in the examples 1 and 3 to 7 which are provided with the conductive branch portion in which the hardness is lower than the side rubber portion, in comparison with the comparative example 1 in which the side rubber portion is not provided with the conductive branch portion. In the same manner, it is known that the damping performance is improved in the example 2 which is provided with the conductive branch portion in which the rubber hardness is higher than the side rubber portion, in comparison with the comparative example 1 in which the conductive branch portion is not provided. Further, since an improvement of the absorbability is seen in the example 5 in comparison with the comparative example 1, it is known that an effect can be achieved even if the segmentation of the side rubber by the conductive branch portion is only half in the thickness direction of the side rubber portion.

With reference to the comparative example 1 and the examples 4 to 7 with regard to the weather resistance, it is known that the effect can be achieved, only in the case that the diametrical conductive portion coats the outer surface of the side rubber portion.

Comparing the comparative example 1 and the examples with regard to the cut resistance, since the carcass is protected by arranging the diametrical conductive portion, it is known that the cut resistance is improved. It is also known that it is preferable to arrange the diametrical conductive portion in the outer surface.

What is claimed is:

1. A pneumatic tire comprising:
a nonconductive carcass which runs into a bead portion from a tread portion via a side wall portion;
a side wall rubber which is provided in an outer side of the carcass in the side wall portion;
a rim strip rubber which is provided in an outer side of the carcass in the bead portion; and
a conductive route which electrically connects a ground surface of the tread portion and a rim contact position of the bead portion,
at least one of the side wall rubber and the rim strip rubber being formed by a nonconductive rubber,
wherein a diametrical conductive portion extending in a tire diametrical direction in a tire meridian cross section is provided at least in a nonconductive position in a side rubber portion which is constructed by the side wall rubber and the rim strip rubber, the diametrical conductive portion is formed by a conductive rubber so as to construct a part of the conductive route,
a conductive branch portion is provided so as to be branched from the diametrical conductive portion, extending at least in a thickness direction of the side rubber portion having a dimension in the thickness direction equal to or greater than 0.5 times an axial dimension of the side rubber portion, and is formed by a conductive rubber which has a different hardness from a rubber hardness of the side rubber portion,
wherein the conductive branch portion is arranged in a plurality of rows in the tire diametrical direction,
wherein the conductive branch portion is arranged in a plurality of rows in the tire diametrical direction.

2. The pneumatic tire according to claim 1, wherein the dimension in the thickness direction of the conductive branch portion is equal to the axial dimension of the side rubber portion forming a plurality of segments in the side rubber portion.

3. The pneumatic tire according to claim 1, wherein a leading end of the conductive branch portion terminates at the inner portion of the side rubber portion.

4. The pneumatic tire according to claim 1, wherein the diametrical conductive portion constructed by the conductive rubber is arranged at a position which covers an outer surface of the side rubber portion.

5. The pneumatic tire according to claim 1, wherein the diametrical conductive portion constructed by the conductive rubber is arranged in an inner surface of the side rubber portion, and the conductive branch portion is branched from the diametrical conductive portion so as to extend to an outer side in a thickness direction.

* * * * *